(12) United States Patent
Mozer

(10) Patent No.: US 8,768,707 B2
(45) Date of Patent: Jul. 1, 2014

(54) BACKGROUND SPEECH RECOGNITION ASSISTANT USING SPEAKER VERIFICATION

(75) Inventor: Todd F. Mozer, Los Altos Hills, CA (US)

(73) Assignee: Sensory Incorporated, Santa Clara, CA (US)

( * ) Notice: Subject to any disclaimer, the term of this patent is extended or adjusted under 35 U.S.C. 154(b) by 281 days.

(21) Appl. No.: 13/329,017

(22) Filed: Dec. 16, 2011

(65) Prior Publication Data

US 2013/0080167 A1 Mar. 28, 2013

Related U.S. Application Data

(63) Continuation-in-part of application No. 13/246,666, filed on Sep. 27, 2011.

(51) Int. Cl.
*G10L 21/00* (2013.01)

(52) U.S. Cl.
USPC .................. 704/270; 704/231; 704/270.1

(58) Field of Classification Search
CPC ......... G10L 17/00; G10L 17/04; G10L 15/00; G10L 15/30
USPC .................. 704/246–50, 270–270.1
See application file for complete search history.

(56) References Cited

U.S. PATENT DOCUMENTS

| 5,983,186 | A * | 11/1999 | Miyazawa et al. ............ 704/275 |
| 6,477,500 | B2 * | 11/2002 | Maes ........................... 704/275 |
| 7,769,593 | B2 * | 8/2010 | Venkataraman et al. ..... 704/275 |
| 7,822,318 | B2 | 10/2010 | Miller |
| 8,234,119 | B2 * | 7/2012 | Dhawan et al. ............... 704/270 |
| 8,335,683 | B2 * | 12/2012 | Acero et al. .................... 704/9 |
| 8,452,597 | B2 * | 5/2013 | Bringert et al. ............... 704/251 |
| 8,558,697 | B2 | 10/2013 | Clough |
| 2002/0116196 | A1 | 8/2002 | Tran |
| 2003/0097255 | A1 | 5/2003 | Gordon |
| 2004/0128137 | A1 | 7/2004 | Bush |
| 2004/0148170 | A1 * | 7/2004 | Acero et al. .................. 704/257 |
| 2004/0236575 | A1 * | 11/2004 | Goronzy et al. .............. 704/231 |
| 2005/0137866 | A1 | 6/2005 | Dow et al. |
| 2005/0165609 | A1 | 7/2005 | Zuberec |
| 2006/0009980 | A1 | 1/2006 | Burke |
| 2006/0074658 | A1 | 4/2006 | Chadha |

(Continued)

FOREIGN PATENT DOCUMENTS

KR 10-2008-0052304 A 6/2008

OTHER PUBLICATIONS

International Search Report dated Feb. 28, 2013 from International Application No. PCT/US2012/056351 filed Sep. 20, 2012.

(Continued)

*Primary Examiner* — Douglas Godbold
(74) *Attorney, Agent, or Firm* — Fountainhead Law Group, PC

(57) ABSTRACT

In one embodiment, a method includes receiving an acoustic input signal at a speech recognizer. A user is identified that is speaking based on the acoustic input signal. The method then determines speaker-specific information previously stored for the user and a set of responses based on the recognized acoustic input signal and the speaker-specific information for the user. It is determined if the response should be output and the response is outputted if it is determined the response should be output.

25 Claims, 9 Drawing Sheets

(56) References Cited

U.S. PATENT DOCUMENTS

| | | |
|---|---|---|
| 2006/0085199 A1 | 4/2006 | Jain |
| 2006/0111894 A1 | 5/2006 | Sammarco |
| 2006/0287854 A1 | 12/2006 | Smolenski |
| 2008/0167868 A1 | 7/2008 | Kanevsky |
| 2008/0208578 A1 | 8/2008 | Geller |
| 2008/0215337 A1 | 9/2008 | Greene |
| 2009/0043580 A1* | 2/2009 | Mozer et al. ............... 704/251 |
| 2009/0122970 A1* | 5/2009 | Kearney .................. 379/167.06 |
| 2009/0313165 A1* | 12/2009 | Walter ............................ 705/41 |
| 2009/0327263 A1* | 12/2009 | Maghoul ........................ 707/5 |
| 2010/0198598 A1 | 8/2010 | Herbig et al. |
| 2010/0241428 A1* | 9/2010 | Yiu ............................... 704/233 |
| 2011/0054900 A1 | 3/2011 | Nguyen |
| 2011/0054905 A1* | 3/2011 | Lagadec et al. ............... 704/270 |
| 2011/0093267 A1* | 4/2011 | Witzman ....................... 704/246 |
| 2011/0166855 A1 | 7/2011 | Vermeulen |
| 2011/0307256 A1* | 12/2011 | Schultz ......................... 704/246 |
| 2012/0052907 A1* | 3/2012 | Gilbreath et al. ........... 455/556.1 |
| 2013/0054242 A1 | 2/2013 | Shaw |
| 2013/0080171 A1 | 3/2013 | Mozer |

OTHER PUBLICATIONS

Non-Final Office Action mailed Feb. 6, 2014 from U.S. Appl. No. 13/246,666; 24 pages.

* cited by examiner

BACKGROUND SPEECH RECOGNITION ASSISTANT USING SPEAKER VERIFICATION

CROSS REFERENCE TO RELATED APPLICATIONS

The present application is a continuation in part of U.S. patent application Ser. No. 13/246,666 for "Background Speech Recognition Assistant" filed Sep. 27, 2011, the contents of which is incorporated herein by reference in their entirety.

BACKGROUND

Particular embodiments generally relate to speech recognition.

Speech recognition attempts to make information access easier and simpler through verbal queries and commands. These queries have historically been activated by button presses on a device, such as a smart phone. Using verbal queries allows users to make queries without typing in the query. This makes information access easier when users are busy, such as when users are in cars or simply would not like to type in the queries. After the button press is received, a speech recognizer listens to the query and attempts to respond appropriately. Even though using the button press is easier, sometimes having a user press a button to activate the speech recognizer is inconvenient for a user. For example, the user may be occupied with other activities where using his/her hands to perform the button press may not be possible, such as a user may be driving a car.

Other approaches replace button presses with hands-free approaches that activate the speech recognizer using activation words. For example, trigger phrases are used to activate the speech recognizer, which can then decipher a query and provide an appropriate response after the trigger phrase is received. However, the user must always trigger the speech recognizer. Additionally, since the user has triggered the recognizer, errors in the recognition or responses are typically not tolerated by the user.

In all these approaches, a user is deciding when to issue a query or command. The speech recognizer is affirmatively activated and then a response is expected by the user. Because the user is expecting a response, errors in speech recognition may not be tolerated. Also, because the speech recognizer is only listening for content after activation, certain contexts and important points in a conversation will be missed by the speech recognizer.

Additionally, even when a response is output to a user, the response is a generic response. For example, a speech recognizer may perform a web search using keywords that were recognized. This keyword search would be output to any user that is speaking.

SUMMARY

In one embodiment, a method includes receiving an acoustic input signal at a speech recognizer. A user is identified that is speaking based on the acoustic input signal. The method then determines speaker-specific information previously stored for the user and a set of responses based on the recognized acoustic input signal and the speaker-specific information for the user. It is determined if the response should be output and the response is outputted if it is determined the response should be output.

In one embodiment, A method includes: receiving a signal from a first stage recognizer based on recognition of an acoustic input signal and classification of portions of the acoustic input signal into a classification in a plurality of classifications using a first speech recognition algorithm, the first stage recognizer being configured to recognize the acoustic input signal in an always on mode; activating, by a computing device, the second stage recognizer upon receiving the signal to recognize the acoustic input signal, the second stage recognizer configured to use a second speech recognition algorithm; identifying a user that is speaking based on the acoustic input signal; determining speaker-specific information previously stored for the user; determining a response to the recognized acoustic input signal based on the speaker-specific information; determining if the response should be output based on a ranking of the response; and outputting the response if it is determined the response should be output.

In one embodiment, a system includes: a first stage recognizer configured to recognize the acoustic input signal using a first speech recognition algorithm in an always on mode, the first stage recognizer configured to: receive an acoustic input signal; identify a user that is speaking based on the acoustic input signal; determine speaker specific information previously stored for the user; classify portions of the acoustic input signal into different classifications using a first speech recognition algorithm; determine a second stage recognizer should be triggered based on a selection of a classification based on classified portions being classified with the selected classification and the speaker-specific information; and a second stage recognizer configured to: receive a signal from the first stage recognizer to activate the second stage recognizer; activate the second stage recognizer upon receiving the signal to recognize the acoustic input signal, the second stage recognizer configured to use a second speech recognition algorithm different from the first speech recognition algorithm to recognize the acoustic input signal; determine a response to the recognized acoustic input signal using the speaker-specific information; determine if the response should be output based on a ranking of the response; and output the response if it is determined the response should be output.

The following detailed description and accompanying drawings provide a better understanding of the nature and advantages of the present invention.

DETAILED DESCRIPTION

Described herein are techniques for a background speech recognizer. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1A:
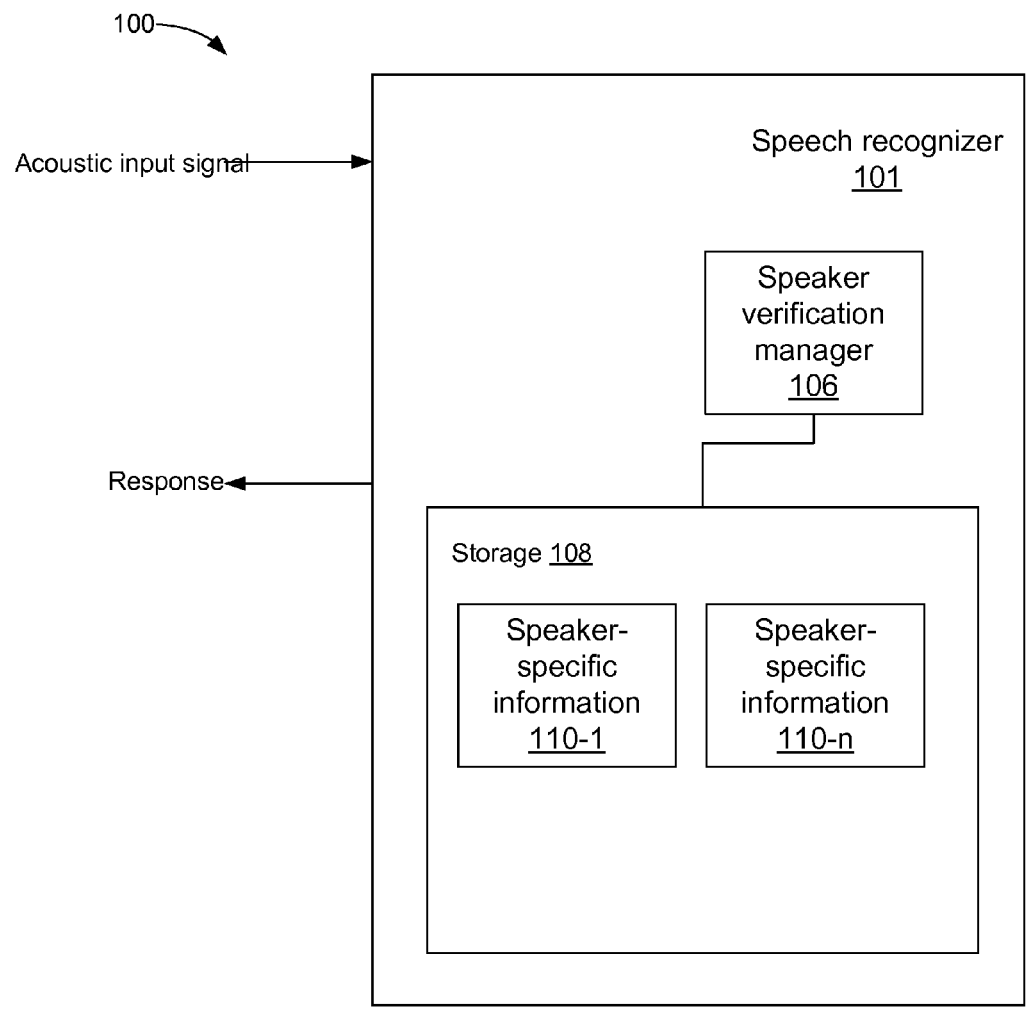
FIG. 1A depicts an example system of a speech recognition system according to one embodiment.

FIG. 1A depicts an example system 100 of a speech recognition system according to one embodiment. System 100 includes a speech recognizer 101 that is "always on" and listening to acoustic input signals received. Thus, speech recognizer 101 is working in the background. Speech recognizer 101 is not listening for a trigger phrase to turn on. Rather, speech recognizer 101 is collecting real meaning and intent from everyday conversation. Because speech recognizer 101 is always on and listening, meaning and intent may be determined from phrases that might not normally be recognized if speech recognizer 101 had to be activated based on a trigger. In another embodiment, speech recognizer 101 is turned on by a trigger phrase. The listening would begin when speech recognizer 101 is turned on.

A speaker verification manager 106 verifies which user is speaking. For example, various users may be speaking at different times, such as in a family, a father, mother, son, and daughter may be speaking in combination or at different times. Speaker verification manager 106 includes algorithms to identify which speaker is currently speaking. For example, speaker verification manager 106 may use a text independent algorithm that is used to determine the speaker. In this algorithm, users may train speaker verification manager 106 in a training process that allows speaker verification manager 106 to learn a signature for the speech of each user. A person of skill in the art will appreciate how to train speaker verification manager 106 to recognize users' speech. After training, when speech recognizer 101 is in the always on mode, speaker verification manager 106 determines who is speaking. Using the text independent algorithm allows speaker verification manager 106 to identify who is speaking while operating in the always on mode, which does not require a user to trigger speech recognizer 101.

Additionally, a text dependent approach may be used to verify the speaker. For example, instead of being always on, speech recognizer 101 is triggered by a trigger word that turns speech recognizer 101 on, and speech recognizer 101 starts listening. A text dependent method of verifying the user may then be performed. For example, the user may have trained speech recognizer 101 to recognize the trigger word. Speech recognizer 101 then can verify the user based on the previously training for the trigger word. Also, the user may speak an additional word after the trigger phrase is spoken and that word is used to identify the speaker.

In another embodiment, after initial verification, additional verifications may result that may be text independent or text dependent. For example, as the user continues to speak, speaker verification may be ongoing to make sure the same user is speaking. For example, the trigger phrase is received and then periodically, speaker verification is performed. A second speaker verification may be performed when a higher security is deemed necessary, such as when signing into websites, accounts, financial transfers, purchases, or other secure situations. Also, a manual login may not be required in a secure situation because the second speaker verification is performed in lieu of the login.

Storage 108 includes speaker-specific information 110 for different users. For example, speaker-specific information 110-1 is associated with a user #1 and speaker-specific information 110-$n$ is associated with a user #n. Speaker-specific information 110 may be stored for any number of users in storage 108. Each speaker-specific information 110 may include information specific to that user. In one example, speaker-specific information 110 is based on speech that was previously recognized for that user, such as the words "soccer" or "vacation" may have been recognized before for that user. Also, in another example, the information may include user preferences, such as that one user likes to skateboard and another user likes soccer. This information may be used when determining responses to the recognized speech. For example, if it is more likely that a user likes soccer, then ads related to soccer may be output when speech is recognized. In one example, if a vacation is being discussed, then a soccer game that is occurring at the time the vacation is taking place may be output as a recommendation of an activity to perform if the user is identified and it is determined the user likes soccer. However, if the user speaking likes skateboards, then a skateboarding event may be output as a response. Accordingly, speech recognizer 101 may provide more personalized responses using the speaker-specific information 110.

Speech recognizer 101 may be determining possible responses in the background, but may not output the responses until it is determined it is appropriate to output a response. The responses may be determined using various methods based on the classifications and interpretations of the acoustic input signal. For example, searches may be performed to determine responses, databases may be searched for appropriate responses, etc. Speech recognizer 101 may rank responses that are determined from the recognized meaning of the phrases. The ranking and type of response (e.g. momentary display on screen, long lasting display on screen, verbal response, etc.) may be based on criteria, such as speaker-specific information 110, relevance, urgency, and/or importance. A response that is associated with soccer may be ranked higher. When a response receives a ranking of a value that indicates the response can be outputted, then speech recognizer 101 may output the response. Because a user has not specifically called speech recognizer 101 to ask for a response, errors in speech recognition may not be considered fatal. For example, speech recognizer 101 may evaluate the responses before outputting the response. If the response is not deemed acceptable, then no response may be output. Because the user has not asked for a response, then the user will not know that a response with an error in it was not provided. However, if the user had asked for a specific response, then it would be unacceptable for errors to be in the response. In this case, the user has not asked for a response.

In another embodiment, the categorization may be performed without any speaker verification. In this case, general responses are determined. However, when a trigger phrase is received, speaker-specific information 110 is used to adjust the responses. In another example, the categorization is not performed until the trigger phrase is received.

Different methods of outputting the response may be based on the ranking that is determined. For example, responses with higher ranking scores may use more intrusive output methods. For example, a verbal output may be used if there was a high level of urgency in the ranking. However, if the urgency is lower, than a less intrusive method may be used, such as displaying a picture or advertisement in a corner of a screen. The length of time the picture or advertisement is displayed could be determined by the importance. Speech recognizer 101 is an assistant that is always on providing help and solutions without being asked, but being smart enough to only intrude when it is determined to be appropriate because of urgency, etc.

The methods of outputting responses may be changed based on speaker-specific information 110. For example, some users may prefer that responses are output on a personal computer. Other users may prefer to be sent a text message. These preferences are taken into account in determining the method of outputting the response.

In one example, a first user may be discussing whether to buy a microwave oven with a second user. The conversation may be discussing what wattage or style (e.g., stainless steel) to buy. Speech recognizer 101 may be situated in a mobile device, such as a cellular phone or tablet, and has not been triggered by the first user or the second user. Speech recognizer 101 may not immediately output a response. Instead, speech recognizer 101 listens to the conversation to derive additional meaning. When speech recognizer 101 classifies the discussion as a "purchase" discussion, it may recognize that a microwave is looking to be purchased, speech recognizer 101 may determine that a response is appropriate. Speaker-specific information 110 may be used to determine that the user previously was discussing stainless steel with respect to other appliances in the kitchen. In this case, it is then determined that the user is looking to buy a stainless steel microwave of a certain wattage is looking to be purchased. The stainless steel microwave would match other appliances in the kitchen. Certain responses may be ranked. For example, a sale at a store may be one response. This response is given a high score because of the relevance (the sale is for a microwave) and the also the urgency (the sale is a limited time offer and/or speech recognizer 101 overhead a sense of urgency in the discussion because it identified that the existing microwave was broken). Thus, an intrusive response of verbal output that a sale at the store is available may be output, and prompt that the item they are looking for is only on sale for 24 hours.

Figure 1B:
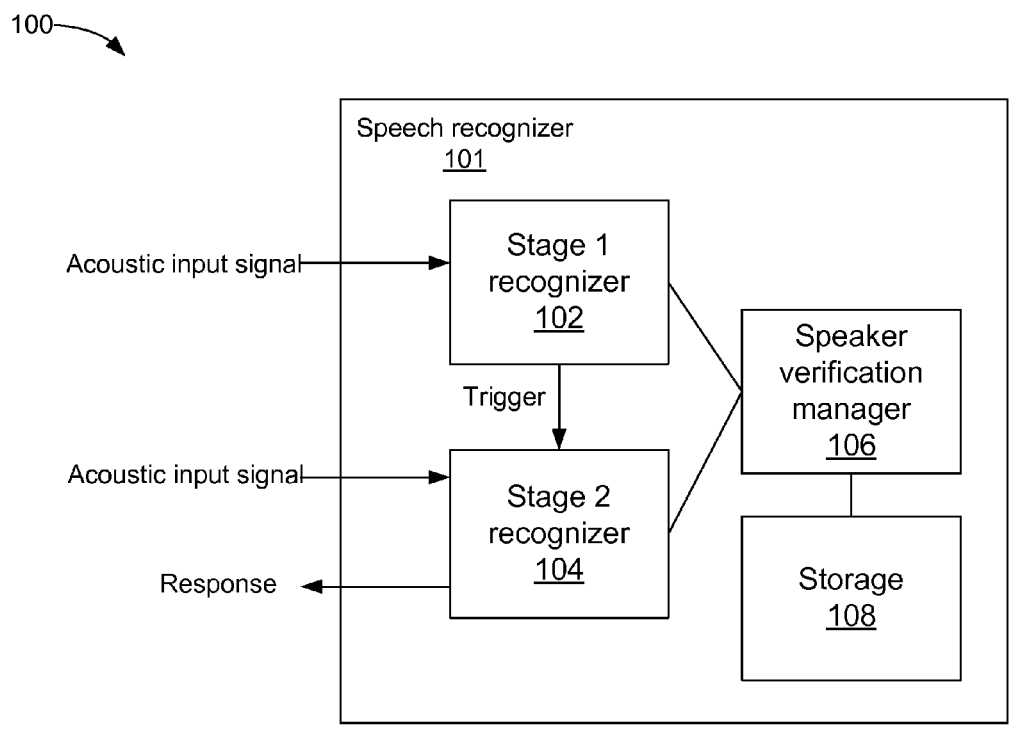
FIG. 1B depicts an example system for providing a two-stage speech recognizer according to one embodiment.

FIG. 1B depicts an example system 100 for providing a two-stage speech recognizer according to one embodiment. Two-stage speech recognizer may perform the functions of speech recognizer 101. Also, although two stages are described, the functions of both stages may be combined into one stage or any number of stages. System 100 includes a stage 1 recognizer 102 and a stage 2 recognizer 104. Stage 1 recognizer 102 and stage 2 recognizer 104 may be located in a same device or in different devices. For example, stage 1 recognizer 102 and stage 2 recognizer 104 may be located in a mobile device, such as smart phones, tablet computers, laptop computers, handheld gaming devices, toys, in-car devices, and other consumer electronics. Additionally, stage 1 recognizer 102 may be located on a first device, such as a client device, and stage 2 recognizer 104 may be located on a second device, such as a server. Stage 1 recognizer 102 may communicate with stage 2 recognizer 104 over a network in this example.

Stage 1 recognizer 102 may be a speech recognition device that is "always on" and listening to acoustic input signals received. Always on may mean that stage 1 recognizer does not need to be triggered (e.g., by a button press or trigger phrase) to begin speech recognition. Examples of always on speech recognizers are included in U.S. patent application Ser. No. 12/831,051, entitled "Systems and Methods for Hands-free Voice Control and Voice Search", filed Jul. 6, 2010, claims the benefit of priority from U.S. Patent Application No. 61/223,172, filed Jul. 6, 2009, and in U.S. patent application Ser. No. 12/831,051, entitled "Reducing False Positives in Speech Recognition Systems", filed Aug. 24, 2011, all of which are incorporated by reference in their entirety for all purposes. For example, any acoustic input signals received by stage 1 recognizer 102 may be analyzed. In one embodiment, stage 1 recognizer 102 is different from stage 2 recognizer 104. For example, stage 1 recognizer 102 may be a low-power recognizer that uses less power than stage 2 recognizer 104. Lower power may be used because the speech recognition algorithm used by stage 1 recognizer 102 may use a smaller memory and fewer computer processor unit (CPU) cycles. For example, stage 1 recognizer 102 may be able to run with a audio front end (e.g., microphone) being on while the CPU processor is running at a lower clock speed or switching on for a short burst while mostly sleeping.

The speech recognition algorithm of stage 1 recognizer 102 may classify keywords that are recognized into pre-defined classifications. Pre-defined classifications may be topics that describe different areas of interest, such as travel, purchases, entertainment, research, food, or electronics. Each classification may be associated with a limited set of keywords. In one embodiment, stage 1 recognizer 102 may be looking for a limited vocabulary of keywords. If a certain number of keywords for a specific classification are detected, then it may be determined that a topic associated with the classification is being discussed. In additions to the number of keywords, the keywords relation to each other; i.e. the search grammar and/or language model may be used as well. Stage 1 recognizer 102 classifies recognized keywords into classifications, and when one classification has enough keywords classified with it, then stage 1 recognizer 102 may trigger stage 2 recognizer 104. Other criteria may also be used, which will be described below.

Stage 1 recognizer 102 may be coupled to speaker verification manager 106 and storage 108 to determine speaker-specific information 110. Speaker-specific information may be used to classify keywords that are recognized into pre-defined classifications. For example, pre-defined classifications may be different for each user based upon their preferences. For example, some users may like travel and other users may like electronics.

Also, the determination of the classifications may be performed based on speaker-specific information 110-1. For example, classifications may be associated with a user. Thus, it is more likely that the trigger to turn on is more appropriate if the classifications are associated with speaker-specific information 110-1. For example, if a user is talking about soccer, and the speaker-specific information 110 indicates the user likes soccer, then it may be more likely that speech recognizer 101 should be triggered to determine a response. However, if the user is talking about skateboards and is not interested in skateboards, then speech recognizer 101 may not be triggered to turn on.

Stage 2 recognizer 104 may be a more accurate speech recognition system as compared to stage 1 recognizer 102. For example, stage 2 recognizer 104 may use more power than stage 1 recognizer 102. Also, stage 2 recognizer 104 uses a more accurate speech recognition algorithm. For example, stage 2 recognizer 104 may require a large memory and CPU cycle footprint to perform the speech recognition. In one example, stage 2 recognizer 104 may use large-vocabulary continuous speech recognition (LVCSR) techniques to describe the language of a specific topic (language model) and converts the acoustic input signal into a probable word trellis that is then accurately parsed using a statistical parser to extract meaning. Stage 1 recognizer 102 or stage 2 recognizer 104 may decide to save information from previous discussions to better classify, solve problems and assist.

In one embodiment, some differences may exist between the speech recognition algorithms. For example, stage 1 recognizer 102 is a keyword based recognizer while stage 2 recognizer 104 may recognize all words. Stage 1 recognizer 102 may have a less complex search grammar than stage 2 recognizer 104; e.g. lower perplexity and lower number of words. Stage 1 recognizer 102 may have a less complex language model than stage 2 recognizer 104 (e.g., number of words, bi-gram vs. tri-gram). Stage 1 recognizer 102 may prune the active states in the search more than stage 2 recognizer 104. Stage 1 recognizer 102 parsing may be simple or non-existent while stage 2 recognizer 104 has a robust statistical parser. Stage 1 recognizer 102 may require less read only memory (ROM) to store the representation and less random access memory (RAM)/millions instructions per second (mips) to score input acoustics against it. Stage 1 recognizer 102 may be a less accurate recognizer than stage 2 recognizer 104 and may use simpler speech features than stage 2 recognizer 104. Stage 1 recognizer 102 may use a smaller/simpler acoustic model than stage 2 recognizer 104.

Stage 2 recognizer 104 may output a response to the detected meaning. For example, when a meaning is determined from the acoustic input signal, stage 2 recognizer 104 may determine an appropriate response. The response may include a variety of sensory interactions including audio, visual, tactile, or olfactory responses. In one example, the output may be an audio response that offers a suggested answer to a discussion the user was having. Other responses may also be provided that enhance a user activity, such as when a user is performing a search on a computer or a television guide, more focused search results may be provided based on stored information from background conversations or immediately spoken information while the search is being conducted. For example, while a search for a movie is being conducted from a text input such as "bad guy movie" the user might say something like "I think it's a remake of a movie, maybe Cape something or other . . . " Another example, certain television shows about travel on the television guide may be displayed at the top of the guide if it is detected a user is discussing travel.

Stage 2 recognizer 104 may also be coupled to speaker verification manager 106 and storage 108 where responses are determined based on speaker-specific information 110. The algorithms used to determine the response may be different based on users. Also, the responses that are determined take into account speaker-specific information 110 to provide more focused search results.

The ranking and type of response may also be based on speaker-specific information 110. For example, rankings may be affected based on a user's preferences in speaker-specific information 110. For example, responses that are about soccer may be ranked higher than responses about skateboards based on the user preferences of liking soccer more.

Figure 2:
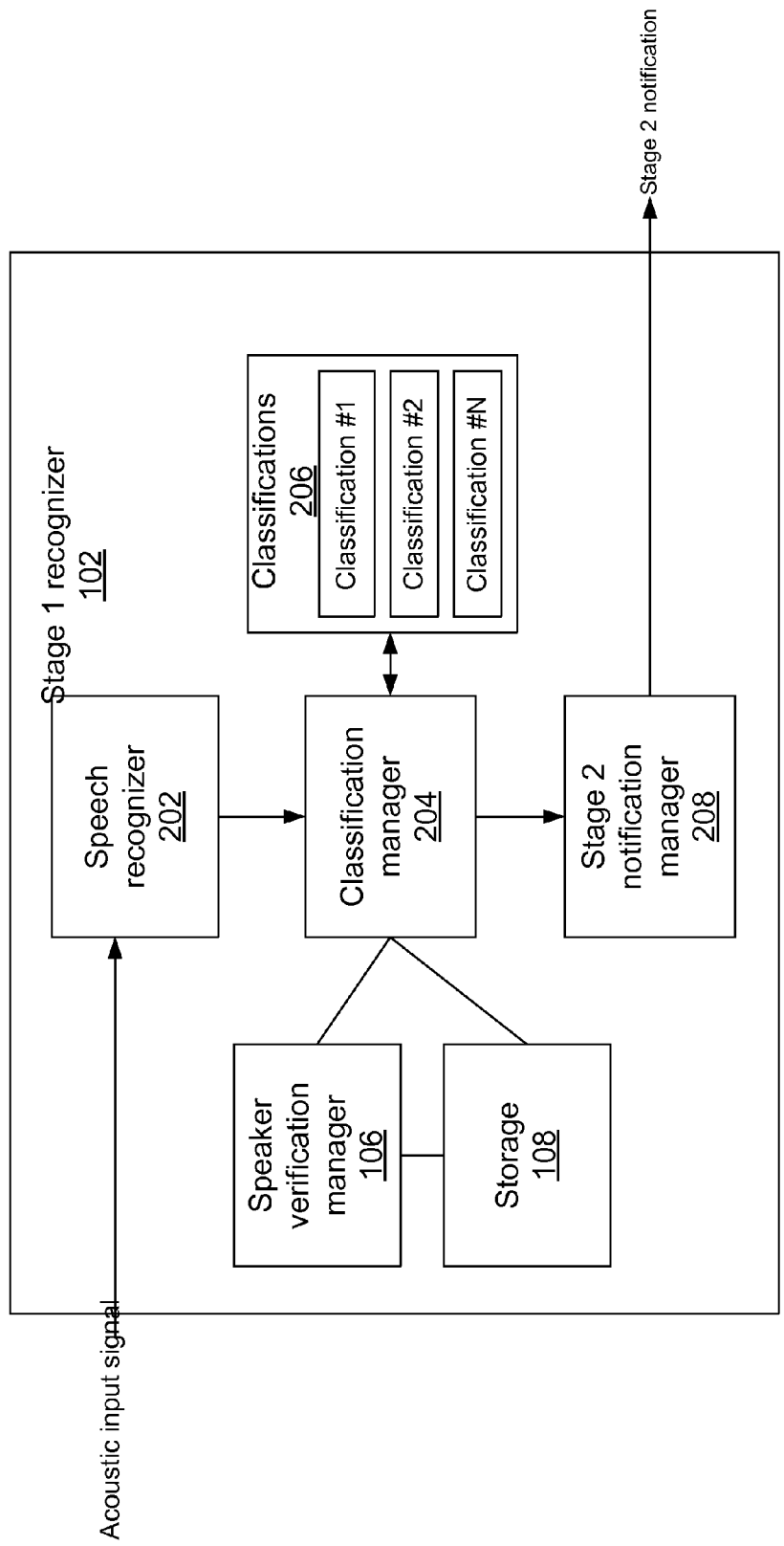
FIG. 2 depicts a more detailed example of a stage 1 recognizer according to one embodiment.

FIG. 2 depicts a more detailed example of stage 1 recognizer 102 according to one embodiment. A speech recognizer 202 receives an acoustic input signal. For example, the acoustic input signal may be conversations that are being detected by an audio front-end of a device. Speech recognizer 202 recognizes certain keywords. The grammar that is being used by speech recognizer 202 may be limited and less than a grammar used by the stage 2 recognizer 104.

A classification manager 204 may classify recognized keywords into classifications 206. Each classification 206 may be associated with a category or topic. Classifications 206 may be pre-defined and a classification 206 may be selected when a number of recognized keywords meet certain criteria. For example, high frequency phrases may be identified by speech recognizer 202. These phrases may uniquely and robustly identify a topic. The frequency of the phrases in addition to the order and distance in time may be used to determine if a classification 206 is selected. These criteria may be defined in classification-specific grammar that is used to determine if a classification 206 is triggered. Once a sufficient number of phrases in an expected relationship to each other are detected, then it may be determined that there is a high probability of certainty that a specific topic is being discussed and a classification 206 is selected.

Classifications 206 may be determined based upon speaker-specific information 110. For example, classifications 206 may be retrieved from speaker-specific information 110 once a user is identified. Each user may be associated with different classifications 206. In other embodiments, classifications 206 may be enhanced based on speaker-specific information 110. For example, different classifications 206 or keywords in classifications 206 may be used based upon the user that is identified.

Figure 3:
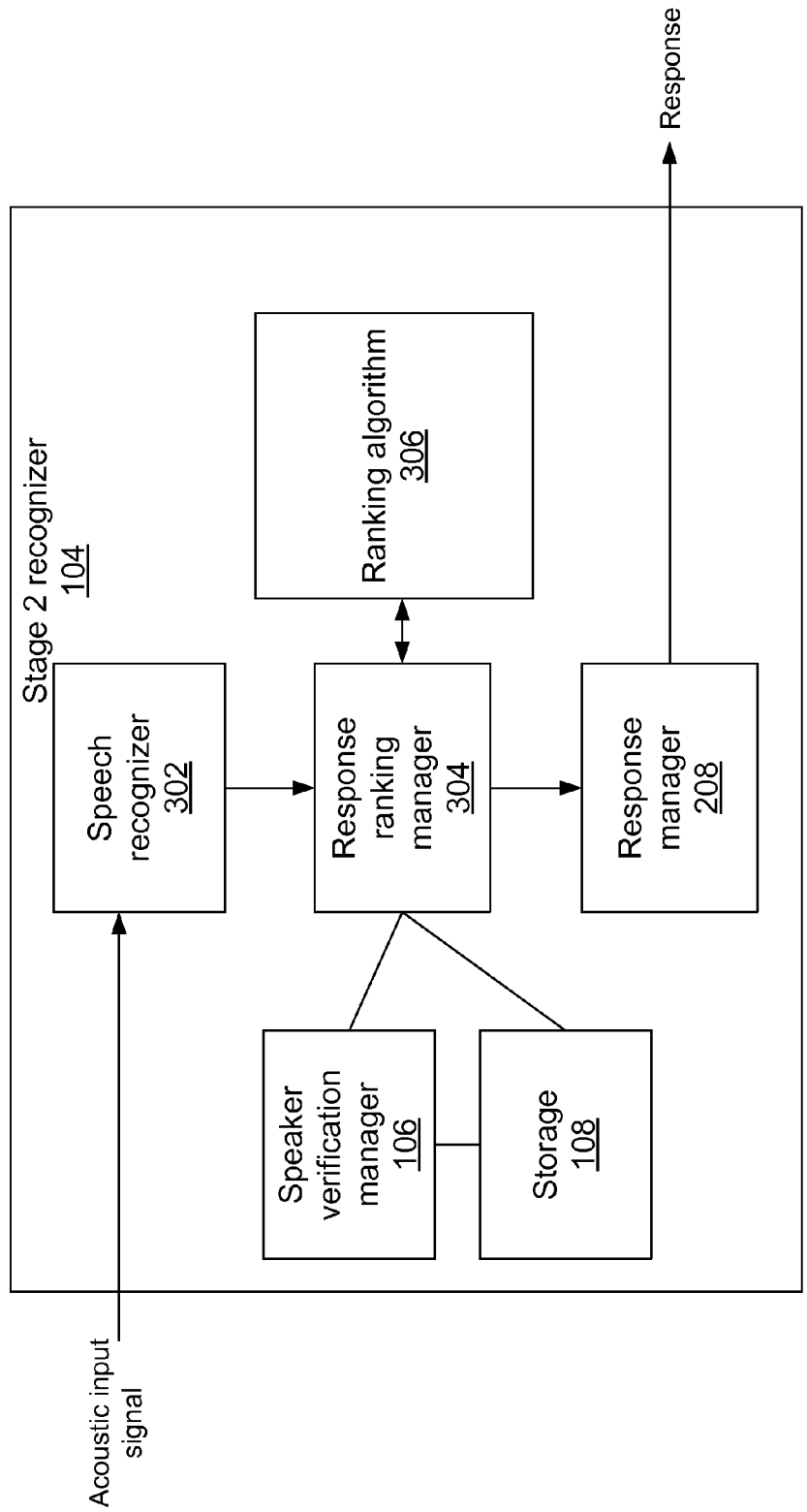
FIG. 3 depicts a more detailed example of a stage 2 recognizer according to one embodiment.

When a classification 206 is selected, a stage 2 notification manager 208 is used to trigger stage 2 recognizer 104. FIG. 3 depicts a more detailed example of stage 2 recognizer 104 according to one embodiment. A speech recognizer 302 receives an acoustic input signal when stage 2 recognizer 104 is triggered. The speech recognition algorithm used to recognize terms in the acoustic input signal may be more accurate than that used by stage 1 recognizer 102.

The classification 206 that is received may also be used to perform the speech recognition. For example, a subset of a vocabulary of words may be selected to perform the recognition.

The responses may be determined in various ways. For example, the meaning of a recognized sentence may be used to search for possible responses. Other methods may also be used, based more on perceived intent than what was actually spoken. Possible responses may also be narrowed based on the classification. For example, when the classification is travel, responses determined are narrowed to be ones associated with travel only. For the multistage recognition process, the classification technique permits stage 1 recognizer 102 to focus on a simpler and easier task of classifying, as opposed to stage 2 recognizer 104, which focuses more on meaning. For example, the "classification" at stage 1 can use the embedded lower power always on system, so the higher powered recognizer only needs to be called up when necessary.

A response ranking manager 304 ranks possible responses based on a ranking algorithm 306. The ranking may be used to determine how to respond. For example, a higher ranking may indicate that a response should be more obvious and intrusive, such as an output audio response. However, a lower ranking may indicate a more subtle response, such as displaying a message on a display on an interface.

Response ranking manager 304 may use speaker-specific information 110 to determine a response. For example, ranking algorithm 306 may be weighted differently based on users' preferences. In one example, certain responses that include content preferred by the user may be ranked higher.

In one embodiment, ranking algorithm 306 may rank responses based on criteria, such as speaker-specific information 110, relevance, urgency, and/or importance. Relevance may be how relevant the response is to the detected meaning. Urgency is how urgent is the response needed, such as when does a user wants to do something, or is an offer that may be provided in response expiring. Importance may define how important the response may be to the user; for example, importance may be determined if the conversation between users is long or the request has been repeated from something said earlier. Other criteria might also be used, such as information that is inferred from the conversation. Importance of information for example can affect the display size and timing.

Multiple responses may be ranked. In one example, the highest ranked response may be output by a response manager 308. In other embodiments, multiple responses may be output simultaneously or in order. Also, a response may not be output based on the ranking, such as if no response is determined with a score high enough to be output. Because a user may not have triggered stage 1 recognizer 102 or stage 2 recognizer 104, the user is not expecting a response, and thus, responses may only be output when an appropriate ranking is determined.

Figure 4:
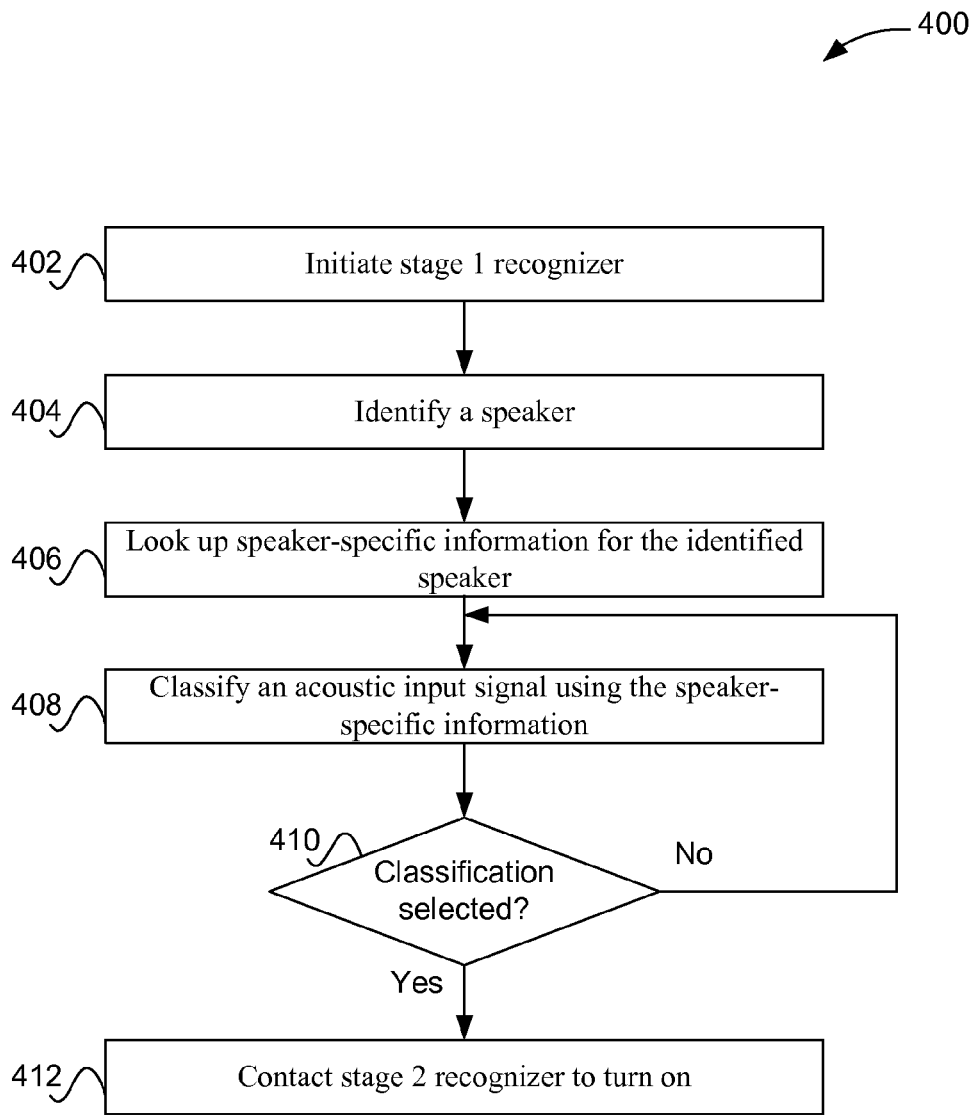
FIG. 4 depicts a simplified flowchart of a method for performing speech recognition using two stages according to one embodiment.

FIG. 4 depicts a simplified flowchart 400 of a method for performing speech recognition using two stages according to one embodiment. At 402, stage 1 recognizer 102 is initiated. Stage 1 recognizer 102 may be always on.

At 404, speaker verification manager 106 identifies a speaker. For example, speaker verification manager 106 may be always on and listening to speech. As the users speak, different users are identified. In one example, multiple users may be identified.

At 406, speaker-specific information 110 is then looked up for the identified speaker. For example, if the user is identified, speaker-specific information 110 for that user is then used to classify the speech.

At 408, stage 1 recognizer 102 classifies an acoustic input signal using speaker-specific information 110. For example, different keywords recognized in the acoustic input signal may be classified. At 410, stage 1 recognizer 102 determines if a classification 206 is selected. For example, if a number of keywords are classified in a classification 206, then it may be determined that stage 2 recognizer 104 should be triggered. If not, the process continues to perform the classification in 404. At 412, stage 1 recognizer 102 contacts stage 2 recognizer 104 to turn on stage 2 recognizer 104.

Figure 5:
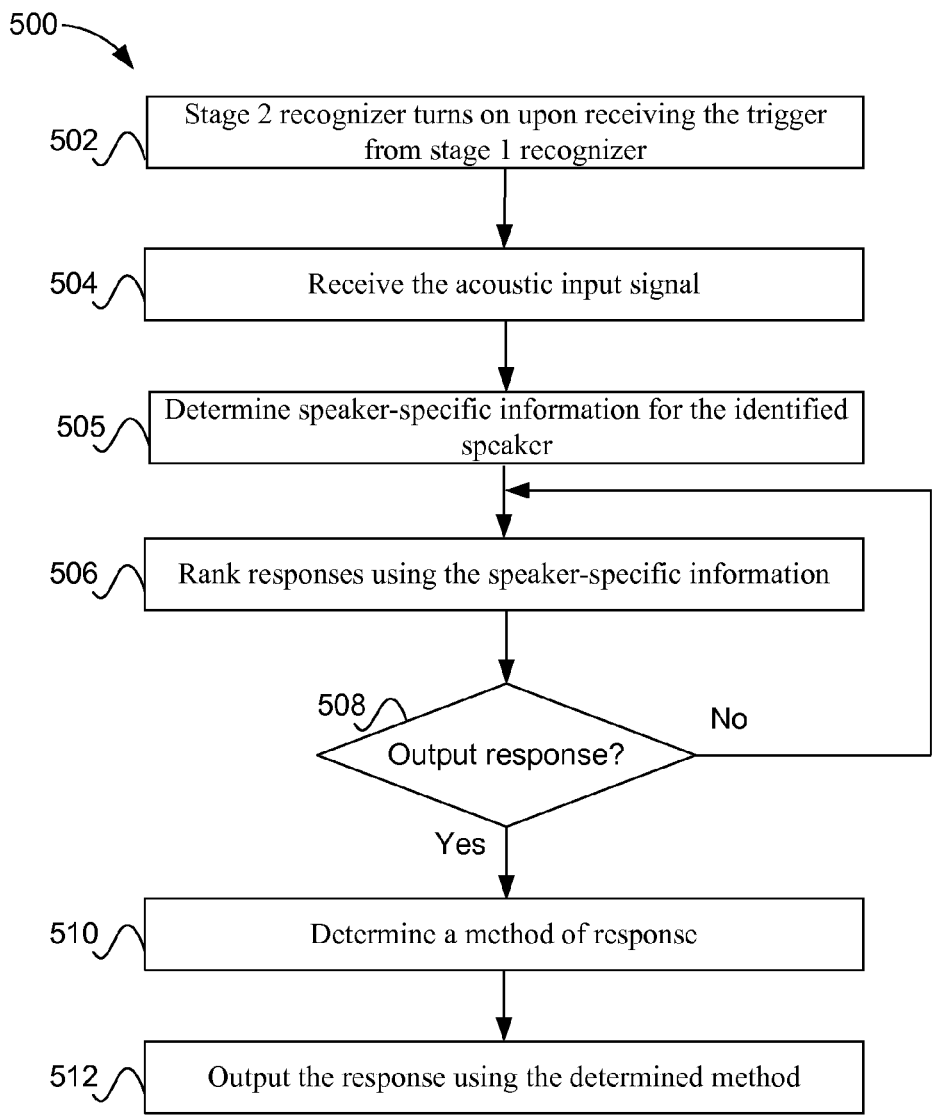
FIG. 5 depicts a simplified flowchart of a method for processing an acoustic input signal at the stage 2 recognizer according to one embodiment.

FIG. 5 depicts a simplified flowchart 500 of a method for processing an acoustic input signal at stage 2 recognizer 104 according to one embodiment. At 502, stage 2 recognizer 104 turns on upon receiving the trigger from stage 1 recognizer 102. Stage 2 recognizer 104 is not always on and only turns on when triggered by stage 1 recognizer 102.

At 504, stage 2 recognizer 104 receives the acoustic input signal. For example, if stage 2 recognizer 104 is co-located with stage 1 recognizer 102, then the acoustic input signal may be received at stage 2 recognizer 104. However, if stage 2 recognizer 104 is located remotely, such as at a server, stage 1 recognizer 102 may send the acoustic input signal to stage 2 recognizer 104.

At 505, stage 2 recognizer 104 determines speaker-specific information 110. For example, stage 2 recognizer 104 may receive identification of who the speaker is. Then, speaker-specific information 110 for that user is determined.

At 506, stage 2 recognizer 104 ranks responses. For example, criteria, such as speaker-specific information 110, as described above are used to rank various responses. At 508, stage 2 recognizer 104 determines if a response should be output. The determination may be based on the ranking. For example, when a response receives a high enough score, then the response is output. If a response to output is not determined, then the process continues at 506 where responses continue to be ranked based on the received acoustic input signal.

If a response to output is determined, at 510, stage 2 recognizer 104 determines a method of response. For example, different responses may be determined based on the ranking. When a response has a high ranking, it may be deemed more important and thus a more intrusive response is provided, such as an audio output. However, when a response is ranked lower, then the response may be less intrusive, such as a message displayed on an interface. At 512, stage 2 recognizer 104 outputs the response using the determined method.

Figure 6:
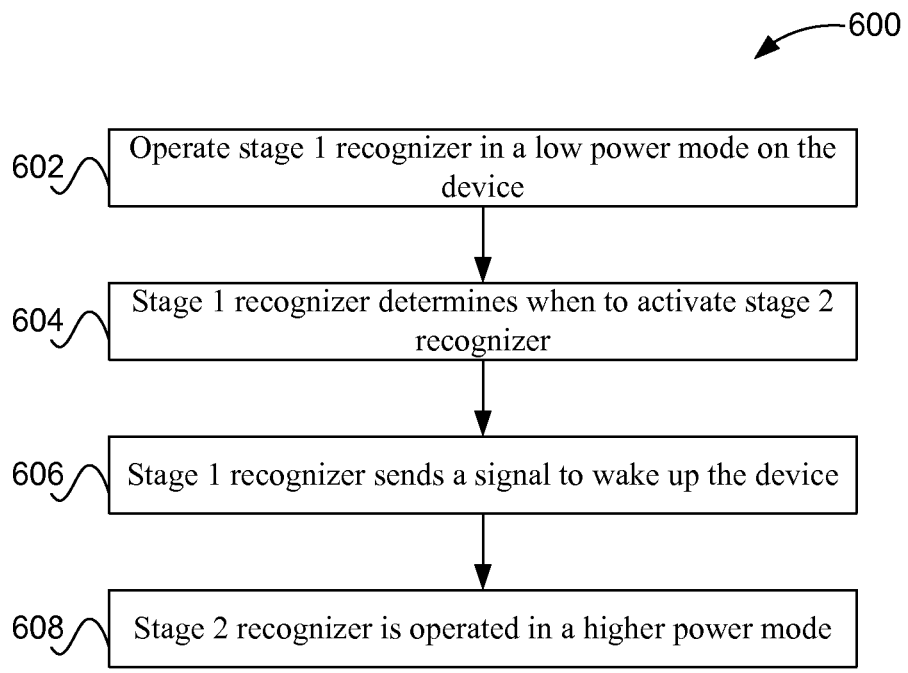
FIG. 6 depicts a simplified flowchart of a method for operating stage 1 recognizer and stage 2 recognizer in a single device according to one embodiment.

In one embodiment, stage 1 recognizer 102 and stage 2 recognizer 104 may be operating in a single device. The device may be powered by a battery in which battery life may be important. The use of stage 1 recognizer 102, which uses less power, but is always on, and triggering a more powerful stage 2 recognizer 104, which uses more power, may be desirable in this type of device. FIG. 6 depicts a simplified flowchart 600 of a method for operating stage 1 recognizer 102 and stage 2 recognizer 104 in a single device according to one embodiment. At 602, stage 1 recognizer 102 is operated in a low power mode on the device. For example, the device may be in a standby mode in which stage 1 recognizer 102 is operating in the background. Because stage 1 recognizer 102 may require fewer CPU cycles, stage 1 recognizer 102 may operate while the device is on standby. Standby is different from an active mode where the device may be fully powered. For example, in standby mode the screen light would be turned off and no functions would be enabled beyond the microphone preamp circuitry and a lightweight processor (e.g. lower clock cycle implementation, etc.). Although the recognize remains on, all other functions are powered down to minimize power consumption. These recognition modes and stages may automatically be determined to save power. For example, a plugged in device might be always on acting as a single recognizer, whereas a battery powered device might use the lower powered stage 1 approach. Also, stage 1 recognizer 102 may be operating while the device is not in standby mode, but is operating as a background process. Thus, while the device is being used, it does not use significant CPU processing power that might degrade the performance of the device.

At 604, stage 1 recognizer 102 determines when to activate stage 2 recognizer 104. For example, a classification 206 may be selected. At 606, stage 1 recognizer 102 sends a signal to wake up the device. For example, the device may be woken up from a standby mode into an active mode.

At 608, stage 2 recognizer 104 is operated in a higher power mode. For example, stage 2 recognizer 104 may require more CPU cycles to perform the speech recognition. Additionally, stage 2 recognizer 104 may have to be operated while the device is in the active mode.

Figure 7:
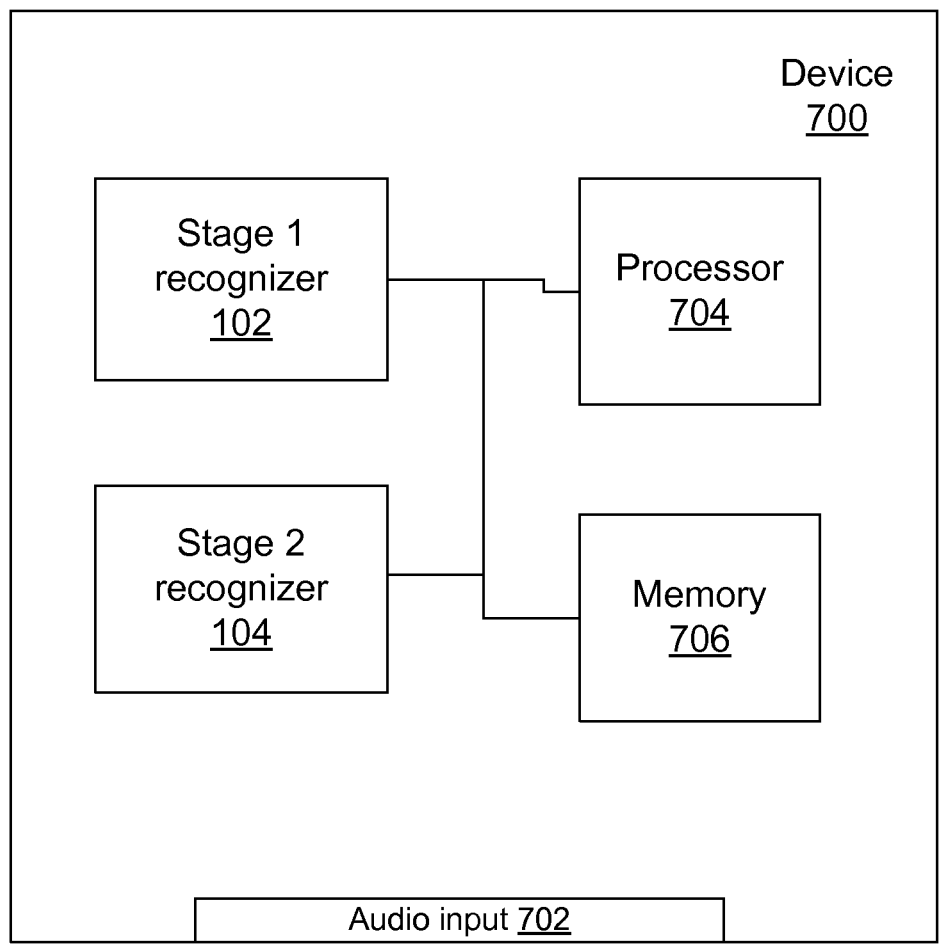
FIG. 7 shows an example of a device including both stage 1 recognizer and stage 2 recognizer according to one embodiment.

FIG. 7 shows an example of a device 700 including both stage 1 recognizer 102 and stage 2 recognizer 104 according to one embodiment. An audio input 702 receives an acoustic input signal. A processor 704 and memory 706 are used by stage 1 recognizer 102 and stage 2 recognizer 104. As described above, fewer CPU cycles of processor 704 may be used by stage 1 recognizer 102 as compared with stage 2 recognizer 104. Further, memory 706 may be random access memory (RAM) where a smaller amount of RAM is used by stage 1 recognizer 102 than stage 2 recognizer 104.

Figure 8:
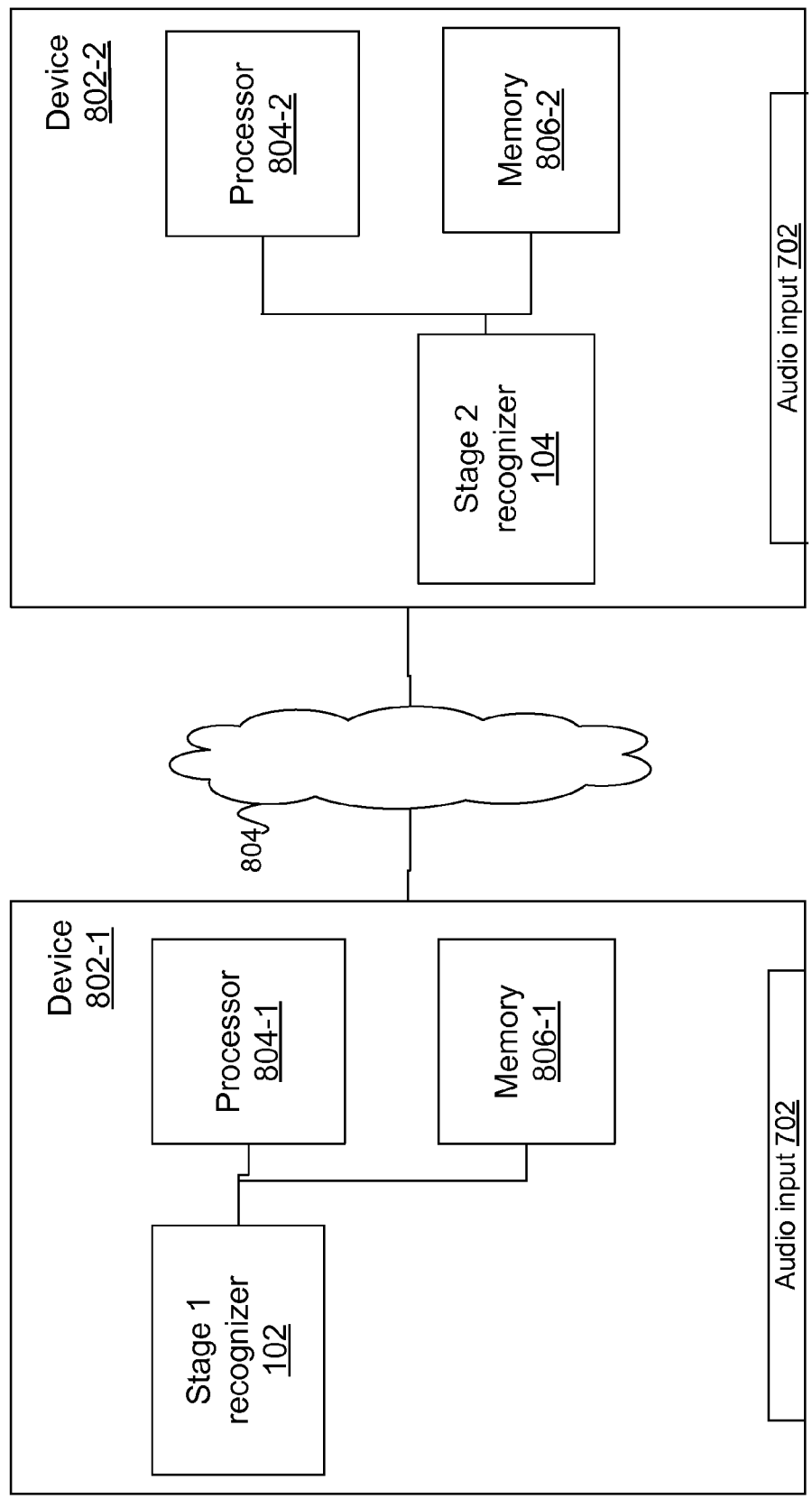
FIG. 8 shows a system for performing speech recognition using two different devices according to one embodiment.

In a different example, FIG. 8 shows a system 800 for performing speech recognition using two different devices according to one embodiment. As shown, a first device 802-1 includes stage 1 recognizer 102 and a second device 802-2 includes stage 2 recognizer 104. First device 802-1 may be a mobile device that is co-located with a user to receive an acoustic input signal at audio input 702. First device 802-1 may communicate with second device 802-2 through a network 808. For example, network 804 may be a wide area network (WAN) or a local area network (LAN). Also, second device 802-2 may be a server.

Stage 1 recognizer 102 may use processor 804-1 and memory 806-1 of device 802-1 and second device 802-2 may use processor 804-2 and memory 806-2 of second device 802-2. In one embodiment, second device 802-2 may be a more powerful computing device thus allowing processing to be offloaded to the more powerful device, which may use less power and battery life on first device 802-1.

Various examples will now be described. A device may be a tablet computer being used at a user's home. The tablet computer may be in standby mode. A first user may be having a conversation with a second user about where they would like to vacation this summer Stage 1 recognizer 102 is always on and identifies the first user and the second user. Stage 1 recognizer 102 retrieves speaker-specific information 110 and determines keywords in the classifications of soccer and skate boarding are associated with the first user and second user, respectively. As stage 1 recognizer 102 recognizes keywords, a classification 206 may be selected. For example, a keyword may be recognized as "vacation" and then other keywords may be recognized that confirm that the "travel" classification should be determined, such as "flight", and "travel". It is determined that the travel classification should be selected and stage 2 recognizer 104 should be activated.

Stage 2 recognizer 104 receives the trigger to activate and also may receive information that a conversation is occurring about the classification of "travel", and that it appears to be a vacation. At this point, stage 2 recognizer 104 may take over listening to the conversation. Stage 2 recognizer 104 may be able to decipher whole sentences and may hear a sentence "Maybe we should do an activity in Ireland." The classification of "travel" may be used to determine content for the response. For example, travel vacation content is searched in the area of soccer for the first user and skateboarding for the second user. At this point, a response may be determined that pictures of Ireland should be output with a coupon for a soccer game in Ireland (or wherever high ranking deals or specials can be found) and a notice for a skateboarding event. The pictures of Ireland may be output to an interface, such as the tablet computer screen. Also, a clickable coupon may be displayed in a corner of the screen to provide a special package deal for the soccer game in Ireland.

If the responses had a higher ranking, then the output method might have been different. For example, a verbal output may have been provided that would either notify the user of the pictures or coupon or some other information may be provided that Ireland has bad storms even in the summertime and perhaps another country, such as Holland, may be considered where Holland has nicer weather and excellent bike trails. If a special fare for the soccer game in Ireland were available for 24 hours, the device might determine it was relevant and urgent enough to verbally interrupt the discussion, and say "excuse me there is a special offer for the soccer game in Ireland available for 24 hours, please see the screen to click for details"

In another example, a user may be using a computing device to perform searches through the Internet. For example, the user may be searching for vacations using a travel website. While the search results are being provided, the output of stage 2 recognizer 104 may be used to narrow the results. For example, the result set from the search query may be narrowed based on speaker-specific information 110. In one example, either the websites returned may be limited to soccer in Ireland websites or additional websites with soccer in Holland may be provided. Other optimizations may also be provided during the search by the user.

In another example, when looking for a movie to download, stage 2 recognizer 104 may recall different concepts that are in speaker-specific information 110, such as sports, an actor's name, or sitcoms. These shows are then the ones moved to the top of the guide. Then, a user may refine the choices even more by providing more input for specific phrases for what has been shown. Additionally, ordering by voice may then be performed.

Accordingly, particular embodiments provide an always on recognizer that uses low power. The speech recognition algorithm may be more lightweight than the stage 2 recognizer algorithm. A trigger is not needed to turn on stage 1 recognizer 102. However, stage 1 recognizer 102 performs general speech recognition for certain keywords associated with classifications 206.

Stage 2 recognizer 104 is activated without a trigger from a user. Rather, the trigger is from stage 1 recognizer 102. Because a user has not specifically called stage 2 recognizer 104 to ask for a response, errors in stage 2 recognizer 104 may not be considered fatal. For example, stage 2 recognizer 104 may evaluate the responses before outputting the response. If the response is not deemed acceptable, then no response may be output. Thus, errors in speech recognition may be tolerated. Because the user has not asked for a response, then the user will not know that a response with an error in it was not provided. However, if the user had asked for a specific response, then it would be unacceptable for errors to be in the response. Further, using stage 2 recognizer 104 to turn on only when needed uses less power and can conserve battery life for devices.

Also, particular embodiments using speaker-specific information 110 may provide for customized and more appropriate responses, such as advertisements. Security features may also allow the automatic log-in to applications, such as social applications. Added security for transactions is also provided because speaker verification is performed. Additionally, specific and not generalized information is provided in an always on environment.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
receiving, by a computing device, an acoustic input signal at a speech recognizer;
identifying, by the computing device, a user that is speaking based on the acoustic input signal;
determining, by the computing device, speaker-specific information previously stored for the user;
determining, by the computing device, a set of classifications, wherein the set of classifications are determined based on the speaker-specific information;
classifying, by the computing device, portions of the acoustic input signal into different classifications in the set of classifications;
selecting, by the computing device, a classification in the set of classifications based on a criterion associated with the classification;
determining, by the computing device, a set of responses based on the recognized acoustic input signal, the classification, and the speaker-specific information for the user;
determining, by the computing device, if the response should be output; and
outputting, by the computing device, the response if it is determined the response should be output,
wherein classifying portions is performed in an always on mode, and wherein identifying the user that is speaking is performed after receiving a trigger phrase to activate the speech recognizer.

2. The method of claim 1, wherein the speech recognizer is configured to recognize the acoustic input signal in the always on mode and the response is outputted without touching computing device or speaking the trigger phrase to activate the speech recognizer.

3. The method of claim 1, wherein the response is outputted after a user speaks the trigger phrase to activate the speech recognizer.

4. The method of claim 1, wherein the wherein the speaker-specific information is associated with previous speech recognition of speech from the user.

5. The method of claim 1, wherein the speaker-specific information is used to modify a classification in the set of classifications based on a preference of the user in the speaker-specific information.

6. The method of claim 5, wherein a set of keywords associated with the speaker-specific information is used in the classification.

7. The method of claim 1, wherein classifying portions is not performed until receiving the trigger phrase to activate the speech recognizer.

8. The method of claim 1, further comprising training the speech recognizer to recognize different user's speech signature.

9. The method of claim 1, further comprising storing speaker-specific information for the user based on the response for use in determining additional responses.

10. The method of claim 1, wherein determining the set of responses comprises:
determining user preferences in the speaker-specific information; and
performing a search using the user preferences and the recognized acoustic input signal.

11. The method of claim 10, further comprising:
determining the set of responses; and
ranking the responses based on the user preferences.

12. The method of claim 1, further comprising:
ranking the set of responses based on criteria and the speaker-specific information;
determining if the response should be output based on a ranking of the response;
determining an output method in a plurality of output methods based on the ranking of the response; and
outputting the response using the output method.

13. A method comprising:
receiving, by a computing device, a signal from a first stage recognizer based on recognition of an acoustic input signal and classification of portions of the acoustic input signal into a classification in a plurality of classifications using a first speech recognition algorithm, the first stage recognizer being configured to recognize the acoustic input signal in an always on mode;
activating, by the computing device, the second stage recognizer upon receiving the signal to recognize the acoustic input signal, the second stage recognizer configured to use a second speech recognition algorithm;
identifying, by the computing device, a user that is speaking based on the acoustic input signal;
determining, by the computing device, speaker-specific information previously stored for the user;
determining, by the computing device, a response to the recognized acoustic input signal based on the speaker-specific information;
determining, by the computing device, if the response should be output based on a ranking of the response; and
outputting, by the computing device, the response if it is determined the response should be output.

14. The method of claim 13, wherein determining the response comprises:
determining a plurality of responses based on the recognized acoustic input signal;
ranking the plurality of responses based on criteria including the speaker-specific information; and
selecting a response based on the ranking.

15. The method of claim 13, wherein the ranking is based on the speaker-specific information, a relevance factor, urgency factor, and an importance factor assigned to the response.

16. The method of claim 13, further comprising:
determining an output method in a plurality of output methods based on the ranking and the speaker-specific information; and
outputting the response based on the output method.

17. The method of claim 13, wherein the first stage recognizer is triggered to turn on and send the signal based on the speaker-specific information.

18. A system comprising:
a first stage recognizer configured to recognize the acoustic input signal using a first speech recognition algorithm in an always on mode, the first stage recognizer configured to:
receive an acoustic input signal;
identify a user that is speaking based on the acoustic input signal;
determine speaker specific information previously stored for the user;
classify portions of the acoustic input signal into different classifications using a first speech recognition algorithm;
determine a second stage recognizer should be triggered based on a selection of a classification based on classified portions being classified with the selected classification and the speaker-specific information; and a second stage recognizer configured to:
receive a signal from the first stage recognizer to activate the second stage recognizer;
activate the second stage recognizer upon receiving the signal to recognize the acoustic input signal, the second stage recognizer configured to use a second speech recognition algorithm different from the first speech recognition algorithm to recognize the acoustic input signal;
determine a response to the recognized acoustic input signal using the speaker-specific information;
determine if the response should be output based on a ranking of the response; and
output the response if it is determined the response should be output.

19. The system of claim 18, wherein the second stage recognizer determines an output method to output the response based on the speaker-specific information.

20. The system of claim 19, wherein the first stage recognizer classifies portions of the acoustic input signal into different classifications, wherein the different classifications are determined based on the speaker-specific information.

21. A method comprising:
receiving, by a computing device, a trigger phrase;
activating, by the computing device, a speech recognizer based on receiving the trigger phrase;
receiving, by the computing device, an acoustic input signal at the speech recognizer;
identifying, by the computing device, a user that is speaking based on the acoustic input signal or the trigger phrase;
determining, by the computing device, speaker-specific information previously stored for the user;
determining, by the computing device, a set of classifications, wherein the set of classifications are determined based on the speaker-specific information;
classifying, by the computing device, portions of the acoustic input signal into different classifications in the set of classifications;
selecting, by the computing device, a classification in the set of classifications based on a criterion associated with the classification;
determining, by the computing device, a set of responses based on the recognized acoustic input signal, the classification, and the speaker-specific information for the user; and
outputting, by the computing device, the response if it is determined the response should be output wherein classifying portions is performed in an always on mode, and wherein identifying the user that is speaking is performed after receiving the trigger phrase to activate the speech recognizer.

22. The method of claim 21, further comprising verifying who is speaking after receiving the trigger phrase to determine if the identified user that is speaking is still speaking.

23. The method of claim 22, wherein the verifying is performed periodically.

24. The method of claim 22, wherein a second verifying who is speaking occurs when a higher security is deemed necessary.

25. The method of claim 24 where a manual log in is not required in a secure situation because the second verifying is performed.

* * * * *